「United States Patent [19]

Piramoon

[11] Patent Number: 5,527,257
[45] Date of Patent: Jun. 18, 1996

[54] ROTOR HAVING ENDLESS STRAPS FOR MOUNTING SWINGING BUCKETS

[75] Inventor: Alireza Piramoon, Santa Clara, Calif.

[73] Assignee: Piramoon Technologies, Inc., Mountain View, Calif.

[21] Appl. No.: 306,508

[22] Filed: Sep. 14, 1994

[51] Int. Cl.$^6$ ............................. B04B 5/02; B65H 81/06
[52] U.S. Cl. ................................. 494/20; 494/81; 29/417; 29/889; 156/173; 156/175
[58] Field of Search ..................... 494/12, 16, 20, 494/33, 43, 81, 85, 37; 74/572; 29/417, 525.1, 889; 156/173–175, 250, 264

[56] References Cited

U.S. PATENT DOCUMENTS

| | | | |
|---|---|---|---|
| 4,123,949 | 11/1978 | Knight, Jr. et al. | 74/572 |
| 4,176,563 | 12/1979 | Younger | 74/572 |
| 4,183,259 | 1/1980 | Giovachini et al. | 74/572 |
| 4,359,912 | 11/1982 | Small | 74/572 |
| 4,675,001 | 6/1987 | Johanson | 494/16 X |
| 4,860,610 | 8/1989 | Popper et al. | 74/572 |

*Primary Examiner*—Charles E. Cooley
*Attorney, Agent, or Firm*—Townsend and Townsend and Crew

[57] ABSTRACT

A swinging bucket rotor constructed of composite material has a central rotor body including strap retaining surfaces. Wound endless composite fiber straps are provided having central portions which are attached to the respective top and bottom of the central rotor body and loop portions remote from the central rotor body for mounting the swinging buckets. These wound endless straps attach centrally to the central rotor body at the strap retaining surfaces and define bucket retaining loops symmetrically spaced from the spin axis of the rotor at the central rotor body. In the preferred embodiment, each bucket retaining loop holds spaced apart bushings for receiving a trunion shaft. Paired trunions on either side of a central sample tube receiving ring are provided. The trunions fit to the composite loop portions of the endless composite material straps. Typically, four sample receiving buckets are placed within and held by the central sample tube receiving rings. Such loading of the buckets occur by the bucket being lowered into the sample tube receiving rings until they are pendulously supported through the rings by the trunions. There results a swinging bucket rotor having top loading sample tube apertures constructed at its sample retaining loops from composite material disposed in tension with the benefit of reduced construction cost and operational complication.

15 Claims, 12 Drawing Sheets

ROTOR HAVING ENDLESS STRAPS FOR MOUNTING SWINGING BUCKETS

This invention relates to swinging bucket rotors for centrifuges. Specifically, a rotor is disclosed having top loaded trunion mounted buckets on composite material straps for an overall reduction in rotor weight and cost with increases in manufacturing and operational simplicity.

BACKGROUND OF THE INVENTION

Swinging bucket rotors for centrifuges are known. Special swinging bucket centrifuge rotors are typically mounted to conventional centrifuges. These conventional centrifuges having a driving motor, a vertical shaft ending in an upper rotor coupling with a rotor containing the swinging buckets mounted to the coupling. Because the swinging buckets pivot outward from the rotor body giving the rotor an irregular and high windage profile, such swinging bucket rotors are usually confined in an evacuated chamber or bowl during centrifugation.

Swinging bucket rotors usually include a central supporting rotor body and a series of peripherally mounted swinging sample tubes or "buckets." These swinging buckets are mounted symmetrically around the periphery of the central supporting rotor body at a constant radius from the spin axis of the rotor. In such rotors, material for centrifugation is placed within the bucket. This bucket is mounted for pivot or "swings" on an axis which is both tangent to the circle in which the sample is rotated by the centrifuge and normal to the spin axis of the rotor. This pivot of the bucket on an axis keeps the sample tube or bucket aligned to the force of gravity at all times.

Before the centrifuge is started, the sample containing buckets pendulously hang from the spin axis of the swinging bucket rotor parallel to the central spin axis of the rotor. When the centrifuge starts, centrifugal force causes the bucket to pivot. This pivot continues until the centrifuge bucket is normal to spin axis of the rotor.

Swinging bucket rotors rest within a central supporting rotor body during centrifugation. This central supporting rotor body is typically an all metal construction —usually titanium. Such seating of the buckets into the rotor body both complicates the construction of the rotors and the swinging buckets. A discussion of both the construction of the swinging bucket, and the periphery of the central supporting rotor body is warranted.

Each swinging bucket is typically provided with a male annulus. The rotor at its lower edge is provided with a notch having a complimentary and partial female annulus for receiving the male annulus of the swinging bucket. When the rotor begins centrifugation, the bucket swings from its position parallel to the spin axis of the rotor into a seated position normal to the spin axis of the rotor. The bucket must be seated at its male annulus into the complimentary and partial female annulus of the notch of the rotor. Such a seating of the male annulus of the bucket into the female annulus of the rotor is designed to occur when the bucket is normal to the spin axis of the rotor.

As a beginning complication, the reader will realize that the male annulus of the bucket must freely swing into the partial female annulus of the notch in the central rotor body. This requires that the partial female annulus of the notch in the central rotor body surround less than all of the bucket— otherwise swinging into the central rotor body could not occur. As a consequence, the female annulus of the notch in the central rotor body usually surrounds a little more than one half of the periphery of the swinging bucket.

Mechanisms to assist such seating of the bucket at its male annulus into the female annulus of the notch of the rotor are provided. One such mechanism is set forth in Chulay U.S. Pat. No. 4,190,195 issued Feb. 26, 1980 entitled *Hanger Design for a Swinging Centrifuge Rotor*.

Over simplified, the mechanism for seating the swinging bucket is discretely attached to the central rotor body. This mechanism includes a bucket attachment to a pivot axis with connection between the bucket and axis provided by a spring. When centrifugation begins, the bucket pivots on the pivot axis from a position parallel to the spin axis of the rotor to a position normal to the spin axis of the rotor. In such pivotal movement, the male annulus of the swinging bucket overlies—but does not contact—the partial female annulus of the bucket receiving notch of the rotor.

As centrifugation proceeds with increasing speed of the rotor, the centrifugal force on the now normal to the spin axis bucket—transmitted through the pivot axis—stretches the spring. The bucket moves outward against the force of the spring. The male annulus of the swinging bucket seats in the partial female annulus of the notch of the central rotor body. Once the male annulus of the bucket is seated in the partial female annulus of the notch of the rotor, the spring is essentially inactive. Centrifugation continues with the rotor proceeding to full speed with the notch of the rotor and the annulus of the swinging bucket providing the sole active connection of the bucket to the rotor. When centrifugation is complete, the rotor slows, the seating process is reversed and sample tube inside of the buckets are removed and processed further.

Such swinging bucket rotors are complicated and expensive. First, the central rotor body is of complex construction. Machining of the periphery of the rotor to provide notches having the required partial female annuluses ready to receive the male annuluses of the buckets requires great care. When it is remembered that each notch constitutes a discontinuity or "stress riser" in the periphery of the rotor which can propagate destructive rotor cracking, some of the difficulty of construction and expense in the manufacture of the central rotor body can be appreciated. It is common for the fabrication of such rotor bodies to include five or six axis metal cutting and shaping machines for producing complex and relatively smooth but complicated exterior contours to the central rotor body.

Second, installation of the swinging buckets with their contained samples to such rotors is difficult. Because of the requirement that the periphery of the swinging bucket contain notches for receiving the swinging buckets, it is required that the buckets with their sample be installed under an overlying and peripheral lip in the central rotor body. Thus, the point of bucket attachment must be reached by the operator from above the central rotor body to a point of attachment below the central rotor body which is under the protruding and notched lip of the rotor. When it is remembered that such rotors are typically spun in a centrifuge having peripheral safety armor and usually equipped for both accommodating refrigeration and a vacuum, the difficulty of this attachment can be appreciated. Specifically, such swinging buckets are attached at obstructed fastening points on the central rotor body which are removed from direct view. For example, a common swinging bucket rotor occurrence is for a centrifuge operator to fail to observe that one of several buckets is not attached to the rotor.

Third, such rotors are complicated by the mechanisms required for safe dynamic seating of the male annuluses of the buckets into the partial female annuluses on the periphery of the central rotor body. These mechanisms are elaborate and expensive being designed with the purpose of having operation of the swinging bucket rotor as safe as possible. Examples of various schemes for the seating of such swinging buckets can be found in Glasso et al U.S. Pat. No. 3,393,864 issued Jul. 23, 1968, Chulay U.S. Pat. No. 4,190,195 issued Feb. 26, 1980, and Piramoon U.S. Pat. No. 4,391,597 issued Jul. 5, 1983.

Fourth, and despite all precautions which have been developed, such rotors occasionally fail. Most typically, one of the swinging buckets is not installed properly and fails to completely seat itself to the central rotor body. When such a seating failure occurs, one bucket becomes detached, and is thrown outward from the rotor periphery with a bullet like force. The remaining swinging buckets and central rotor body then become radically out of balance on the spin axis of the centrifuge. As a result, the rest of the rotor usually comes apart with resultant damage or destruction of the rotor, the centrifuge can, and at least some damage to the spindle and drive train of the centrifuge.

What follows is a complete departure from the prior art "swinging bucket rotors."

SUMMARY OF THE INVENTION

A swinging bucket rotor constructed of composite material in which a central rotor body for either mounting to a conventional centrifuge spindle or providing a driving connection to a central drive stator is disclosed. This central rotor body includes strap retaining surfaces. Wound endless composite fiber straps are provided having central portions which are attached to the respective top and bottom of the central rotor body and loop portions remote from the central rotor body for mounting the swinging buckets. These wound endless straps attach centrally to the central rotor body at the strap retaining surfaces and define bucket retaining loops symmetrically spaced from the spin axis of the rotor at the central rotor body. In the preferred embodiment, each bucket retaining loop holds spaced apart bushings for receiving a trunion shaft. Paired trunions on either side of a central sample tube receiving ring are provided. The trunions fit to the composite loop portions of the endless composite material straps. Typically, four sample receiving buckets are placed within and held by the central sample tube receiving rings. Such loading of the buckets occur by the bucket being lowered into the sample tube receiving rings until they are pendulously supported through the rings by the trunions. There results a swinging bucket rotor having top loading sample tube apertures constructed at its sample retaining loops from composite material disposed in tension with the benefit of reduced construction cost and operational complication.

Over the prior art, advantages abound. First, elaborate construction of the central rotor body to include notches with female annuluses all carefully machined to minimize stress risers is eliminated. A central rotor body simply constructed of either metal or composite material with only the ability to retain the endless bucket supporting straps is all that is required.

Second, the buckets are exposed for simple top loading. Further, this simple top loading provides the operator with unobstructed view of rotor attachment. There is little excuse for failure to symmetrically load the rotor body with peripheral buckets.

Third, mechanisms for the dynamic seating of the swinging buckets to the rotor are eliminated. Only bushings and trunion shafts having sufficient pivot to maintain the pendulously supported samples parallel to the forces of gravity are required.

Fourth, and due to the simplified construction, incidents of rotor failure can be reduced. Further, higher speeds with greater separating gravities and shorter run times can be achieved.

DESCRIPTION OF THE PREFERRED EMBODIMENT

Figure 1:
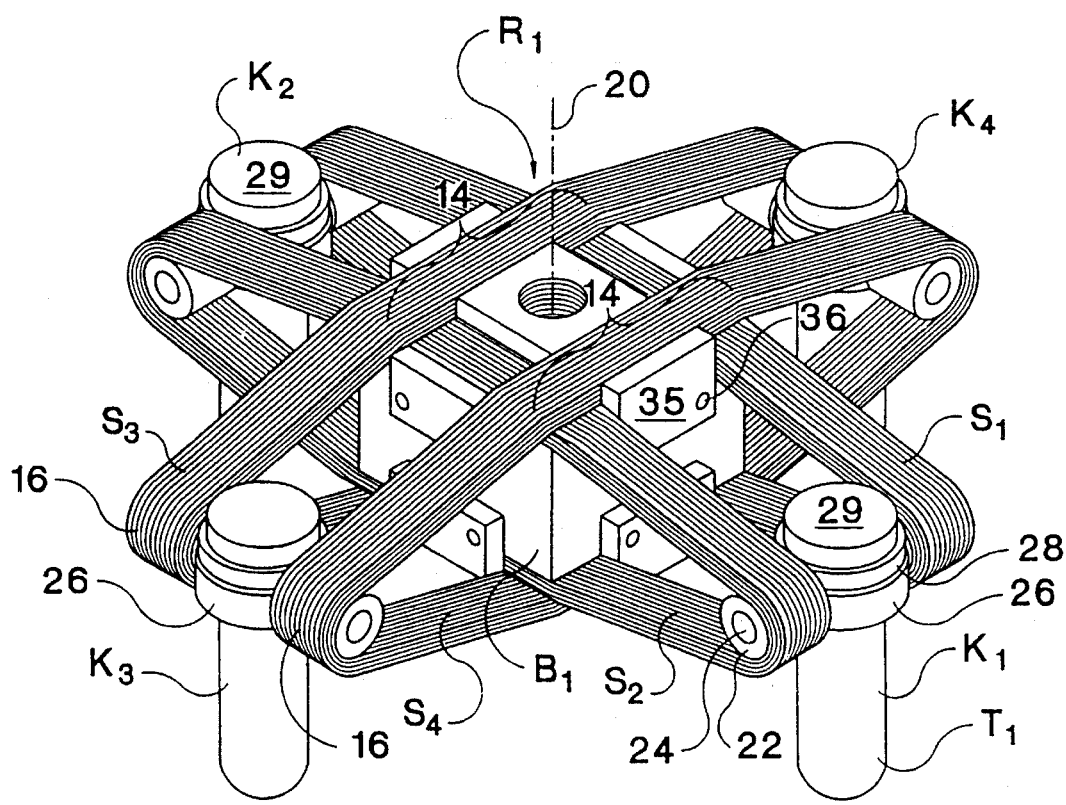
FIG. 1 is a perspective view of the composite material swinging bucket rotor of this invention, the rotor here containing an all metal central rotor body.

Referring to FIG. 1, swinging bucket rotor $R_1$ is illustrated. It includes central rotor body $B_1$ having straps $S_1$-$S_4$ affixed thereto. Straps $S_1$-$S_4$ are non-circular, generally oblong and include medial and adjacent strap portions 14 affixed to central rotor body $B_1$ and distal and opposed strap loops 16 symmetrically disposed from spin axis 20 of central rotor body $B_1$.

Distal and opposed strap loops 16 each contain bushings 22. Each bushing 22 in turn receives trunion 24. Each trunion 24 fastens at opposite sides of sample tube retaining ring 26. Four complete samples are held in swinging bucket rotor assemblies $K_1$-$K_4$.

Sample tube $T_1$ includes sample tube annulus 28 at upper cap portion 29 of sample tube $T_1$. This being the case, the bulk of mass of the sample tube is below trunions 24 attached to each sample tube retaining ring 26. This being the case, sample tube $T_1$ is pendulously suspended with respect to bushings 22 held within distal and opposed strap loops 16. Since bushings 22 allow for trunions 24 to freely pivot, sample tube $T_1$ hangs from trunions 24 in the direction of local gravity. In the case of swinging bucket rotor $R_1$ which is not rotating, local gravity disposes sample tube $T_1$ parallel to spin axis 20.

Figure 2B:
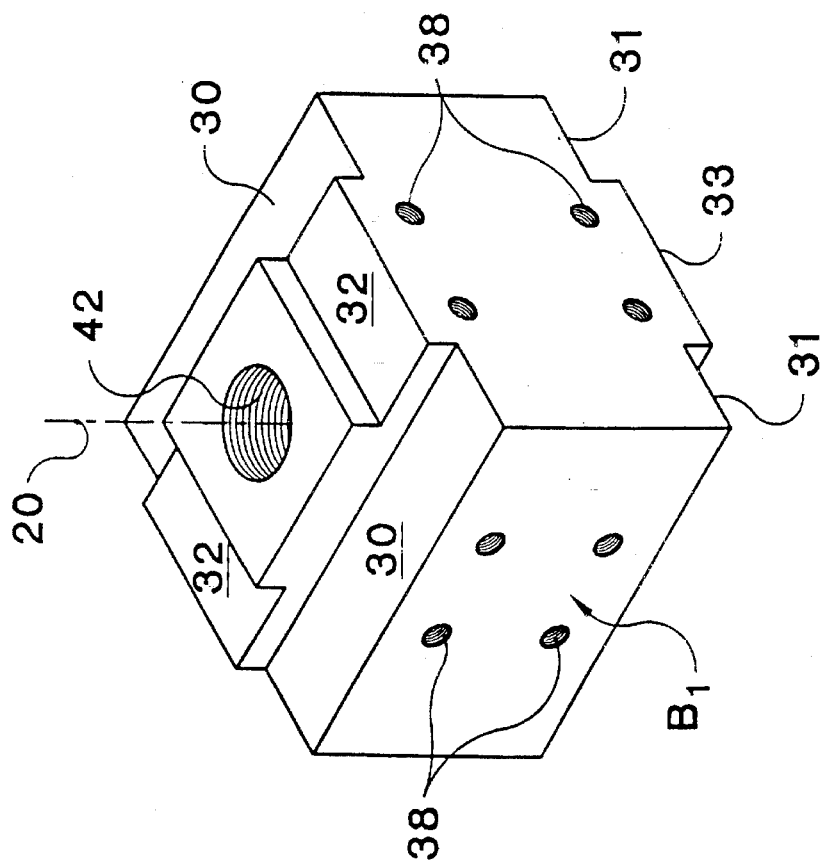
FIGS. 2A and 2B are respective partial perspective section and full perspective section of an all metal central rotor body utilized in the rotor construction of FIG. 1.
Figure 2A:
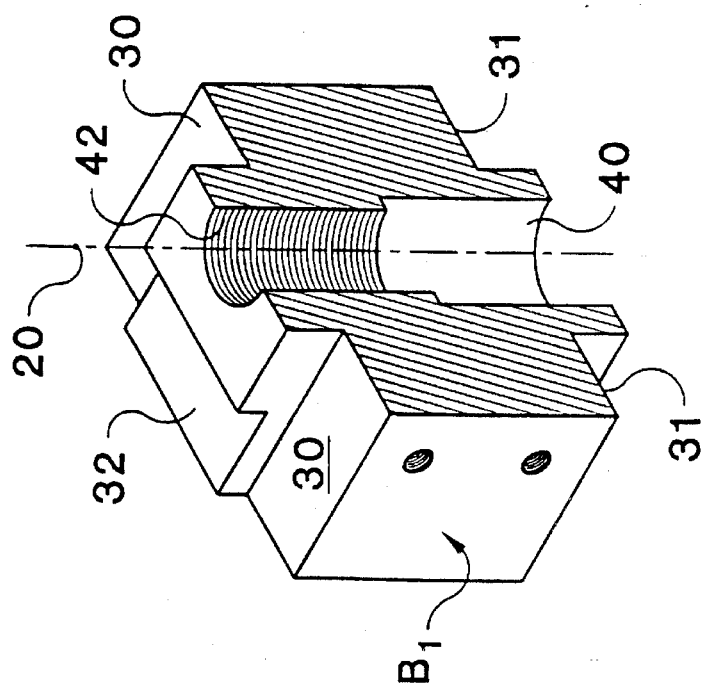

Referring to FIGS. 2A and 2B, construction of central rotor body $B_1$ can be understood. Central rotor body $B_1$ is block shaped and includes at the top portion thereof first upper strap-receiving surfaces 30 and second upper strap-receiving surfaces 32. Further, at and the bottom portion of central rotor body $B_1$, first lower strap-receiving surfaces 31 and second lower strap-receiving surfaces 33. Further, it will be observed that first upper strap-receiving surfaces 30 and first lower strap-receiving surfaces 31 are disposed at 90° to second upper strap-receiving surfaces 32 and second lower strap-receiving surfaces 33.

It will be observed that strap retainers 35 with screw fasteners 36 are utilized in swinging bucket rotor $R_1$. Accordingly, threaded bolt slots 38 are utilized to secure straps $S_1$-$S_4$ in place with respect to central rotor body $B_1$ (see FIG. 1). Finally, and since this rotor is designed for conventional mounting to centrifuge spindle, spindle bore 40 with threaded spindle apertures 42 is concentrically disposed about spin axis 20.

Figure 3:
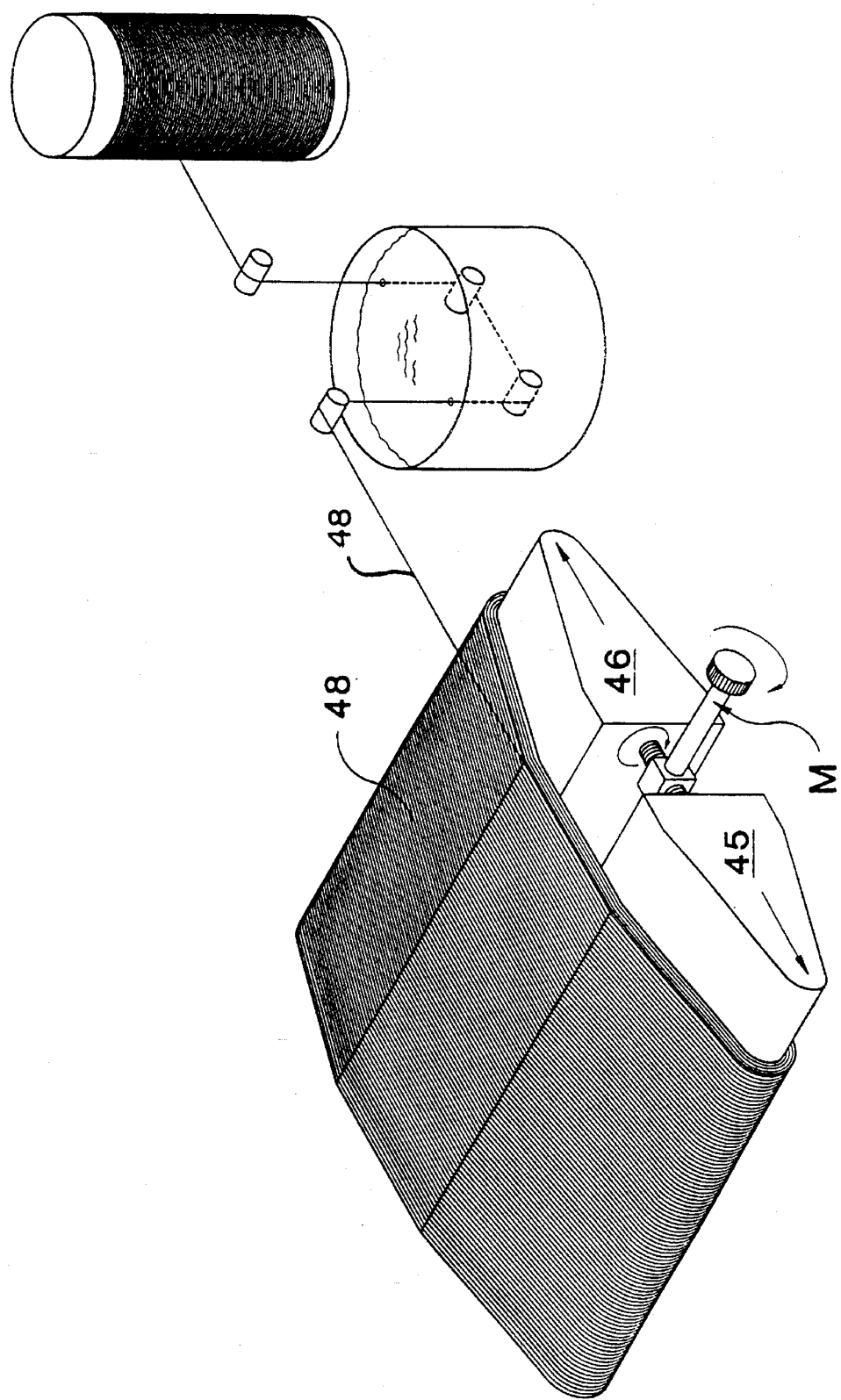
FIG. 3 is a perspective view of a continuous wind being made about an adjustable mandrel for producing the endless composite material straps of the rotor of FIG. 1.

Referring to FIG. 3, the construction of straps $S_1$-$S_4$ can be simply set forth. Adjustable mandrel M having first mandrel segment 45 and second mandrel segment 46 is utilized. A resin impregnated composite fiber tow 48 is wound and cured over adjustable mandrel M when first mandrel segment 45 and second mandrel segment 46 are moved into suitable separation. Thereafter, and as shown in FIG. 4, wound and cured fiber tow 50 is removed and cut into discrete straps S parallel to the direction of the discrete fibers of wound and cured fiber tow 50.

It is instructive to note the particular portions of discrete straps S. Each strap S includes medial and adjacent strap portions 14 and distal and opposed strap loops 16. Between medial and adjacent strap portions 14 and distal and opposed strap loops 16, each discrete strap S has linear strap portion 17. As will hereafter be set forth with respect to FIGS. 6A–6C, this disposition of individual composite fibers within discrete straps S disposes the individual fibers in tension with maximum fiber strength and efficiency in resisting the centrifugal force acting on sample tube $T_1$.

Figure 4:
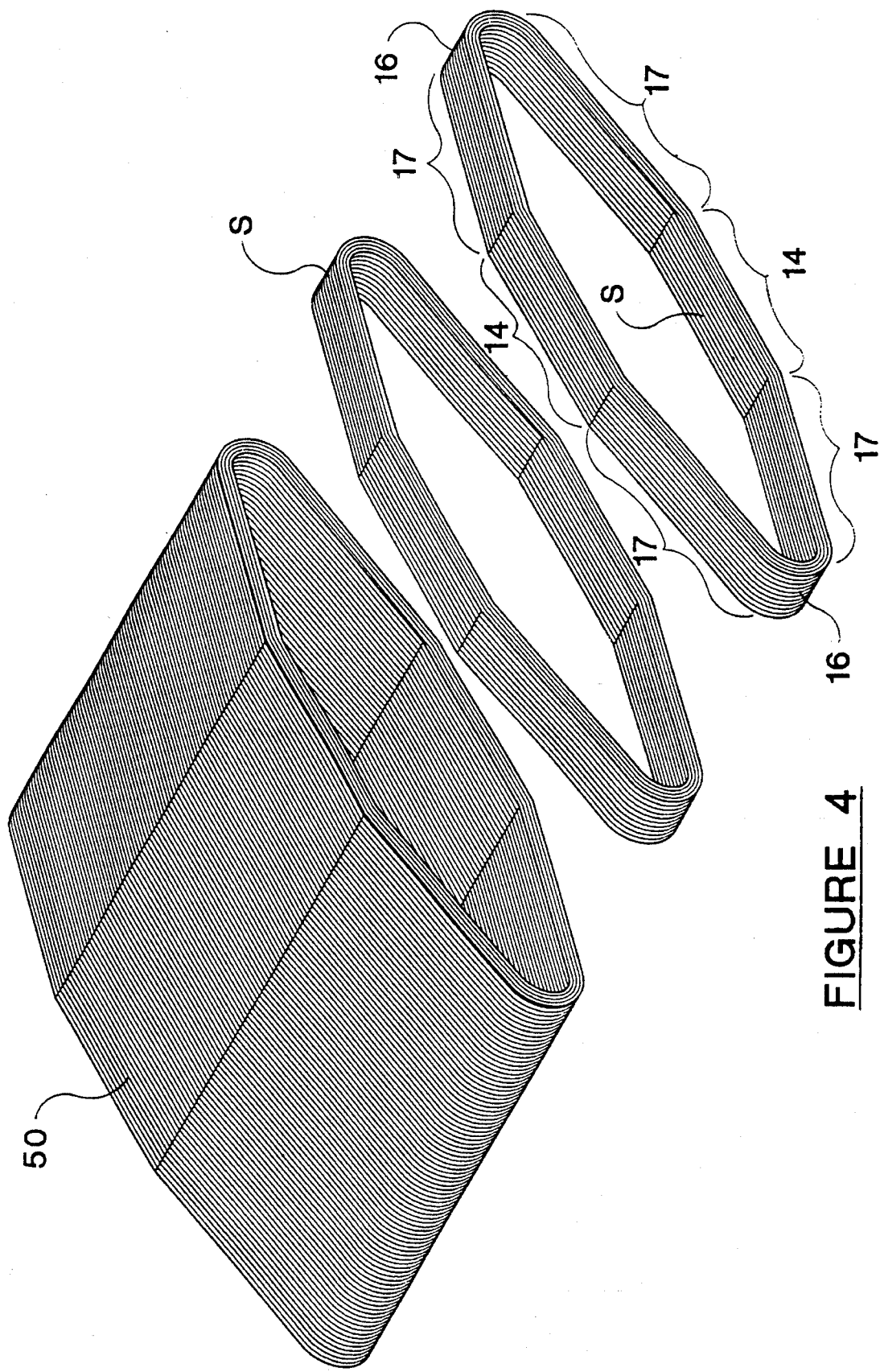
FIG. 4 illustrates the continuous wind produced from the mandrel of FIG. 3 detached from the mandrel and cut to form the discrete straps required for the rotor of FIG. 1.

Looking further at FIG. 4, it can be seen that each strap S forms an endless loop in the nature of a sling. Here, the endless loop includes two opposite an symmetrical opposed strap loops 16 or slings for holding a sample to be centrifugated.

Figure 5B:
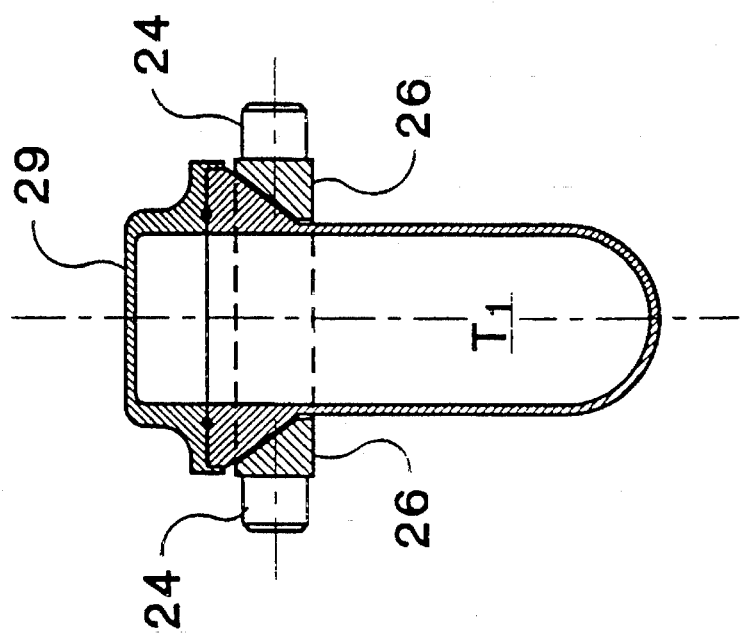
FIGS. 5A and 5B are respective sections of the sample tube holder and the trunion-mounted sample receiving aperture.
Figure 5A:
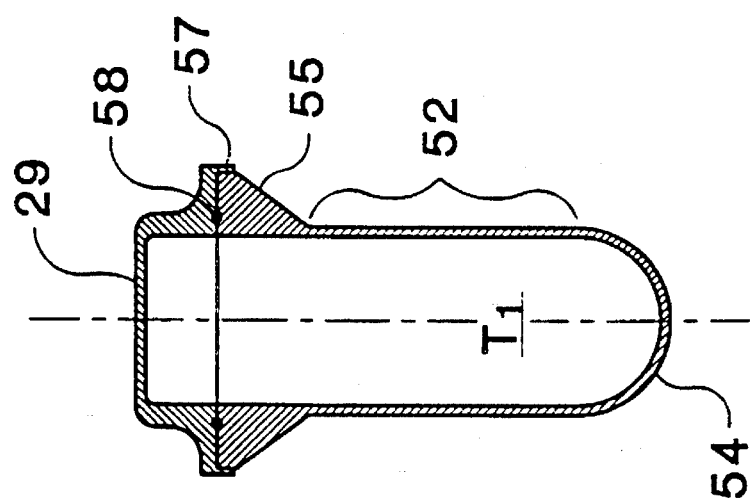

Referring to FIGS. 5A and 5B, construction and mounting of sample tubes $T_1$ can be understood. The sample tube includes elongate sample tube body 52 closed at hemispherical end 54 at the lower end. The upper end of elongate sample tube body 52 terminates in protruding retaining annulus 55. As is conventional, upper cap portion 29 includes sample tube capturing lip 57 with sealing O-ring 58.

Referring to FIG. 5B, sample tube retaining ring 26 is provided. This ring has an interior profile which is complimentary to the exterior surface of protruding retaining annulus 55. Thus, when sample tube $T_1$ is placed within the sample tube retaining ring 26, pendulous retention results.

Figure 6A:
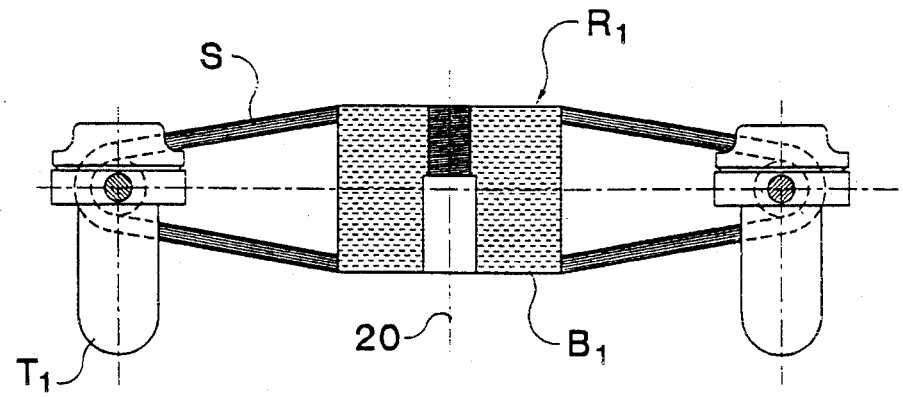
FIGS. 6A, 6B and 6C are respective side elevations of a rotor according to FIG. 1 showing only two swinging buckets and illustrating movement of the buckets from a position parallel to the spin axis to a position normal to the spin axis of the rotor during initial acceleration.
Figure 6B:
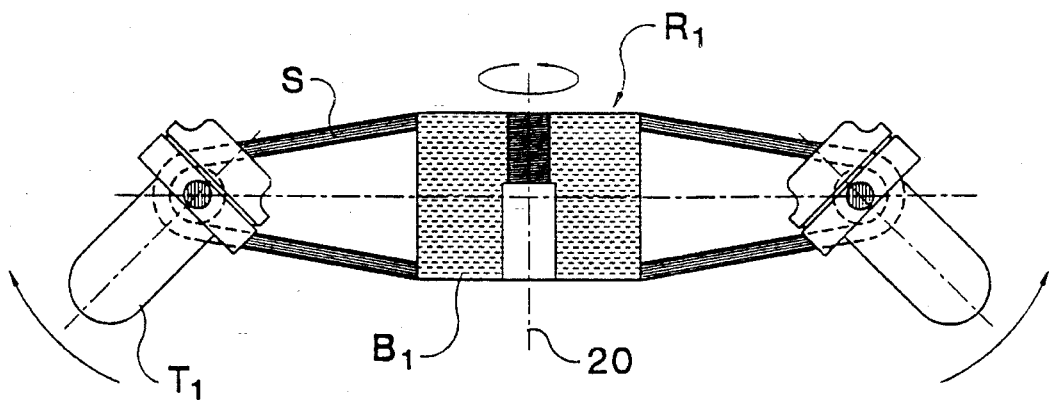
Figure 6C:
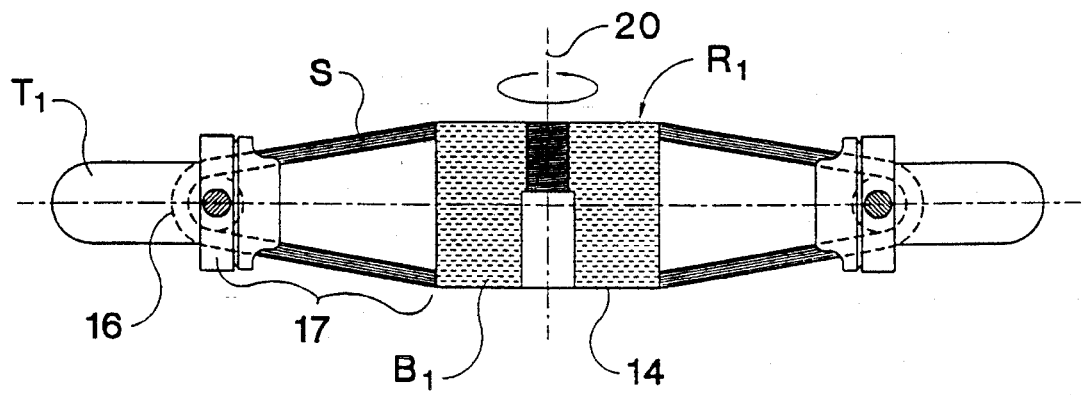

Referring to FIGS. 6A–6C, the cooperation of central rotor body $B_1$, discrete straps S and sample tubes $T_1$ during operation of swinging bucket rotor $R_1$ can be understood.

Before centrifugation begins, as shown in FIG. 6A, sample tubes $T_1$ depend parallel to spin axis 20. This places a cantilever type loading on discrete straps S, which straps have little relative strength across the discrete fibers from which they are constructed. However, since the loading is completely static, loading is relatively small and trouble free discrete straps S can easily carry the weight of sample tube $T_1$.

As swinging bucket rotor $R_1$ begins to turn, sample tube $T_1$ begin to pivot. (See FIG. 6B). When substantial speed is attained, sample tubes $T_1$ are disposed normally away from spin axis 20. Thereafter, swinging bucket rotor $R_1$ proceeds to the full speed of centrifugation where maximum dynamic loading is imposed upon discrete straps S.

It will be observed that all fibers in discrete straps S will then be disposed in tension. Specifically, medial and adjacent strap portions 14 across central rotor body $B_1$ will be in tension. Likewise, linear strap portion 17 will be in tension—there will be no substantial loading across the fibers other than the vertical cantilever loading occurring in FIG. 6A. Finally, bushings 22 will be held by distal and opposed strap loops 16 again in tension. In other words, only tensile forces—and no other substantial loading will be experienced along the composite fiber of discrete straps S!

Figure 8:
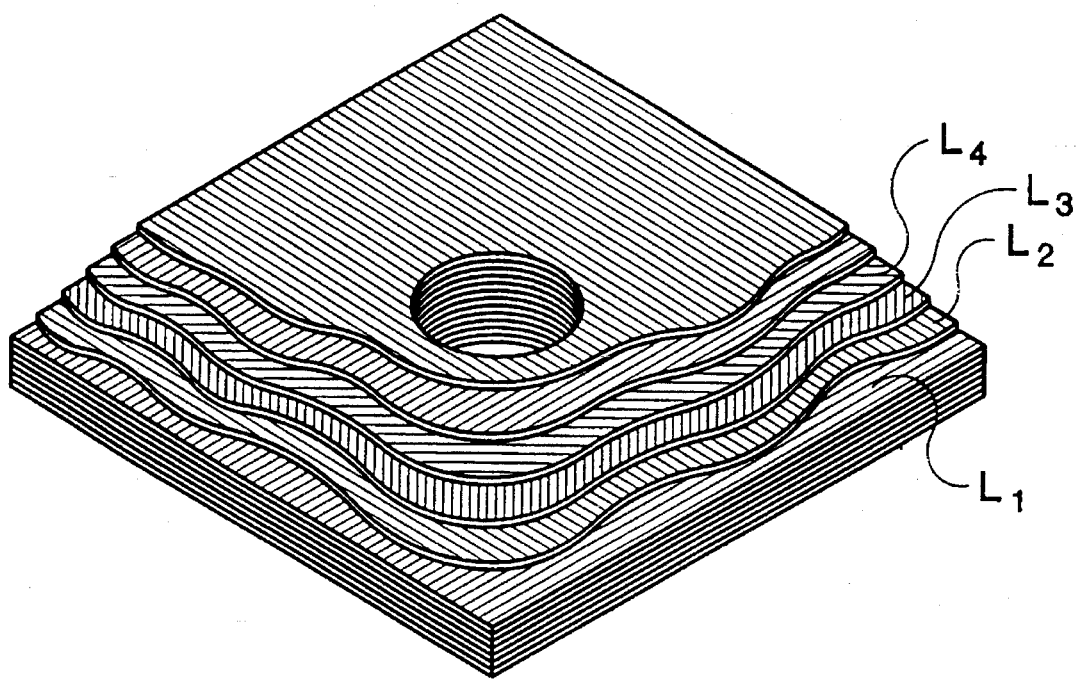
FIG. 8 illustrates the central rotor body constructed of laminates having parallel composite fibers.
Figure 9:
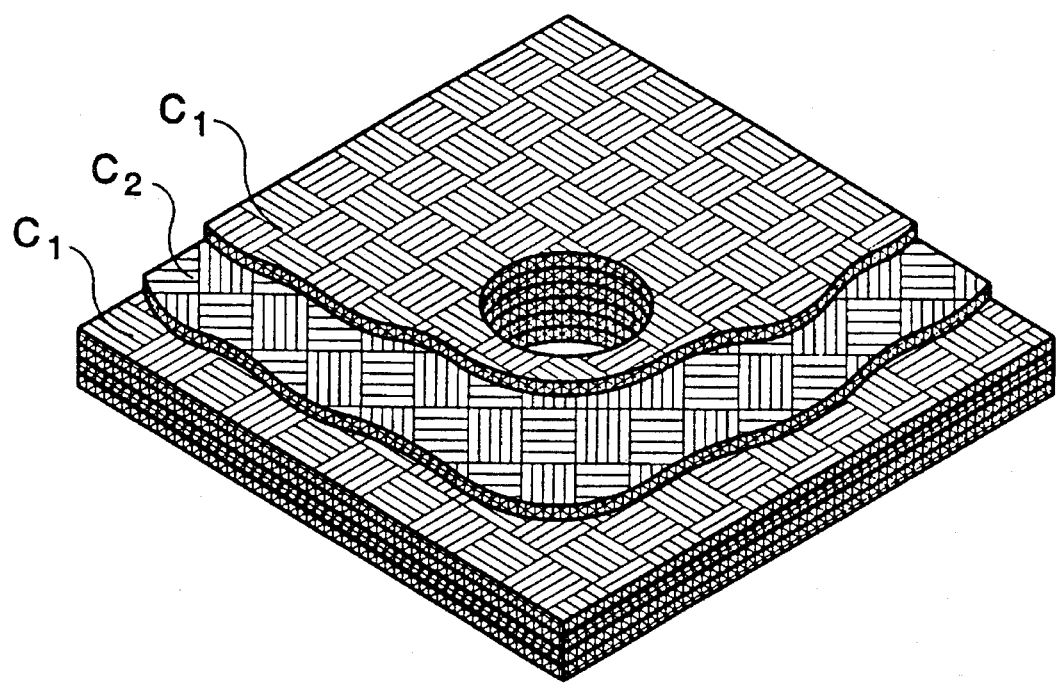
FIG. 9 illustrates the central rotor body constructed of laminates having composite woven fabric into a continuous fabric.

For certain rotor constructions, central rotor body $B_2$ can be constructed itself of composite fiber laminates. Sections of such parallel fiber laminates $L_1$-$L_4$ are shown in FIG. 8 with parallel fibers of adjacent layers $L_1$-$L_4$ having differing angular orientations with respect to spin axis 20 of central rotor body $B_2$. Alternately, composite woven fabric laminates $C_1$-$C_2$ can be used with adjacent layers having differing fiber orientations in the cloth weave from adjoined layers.

Figure 7:
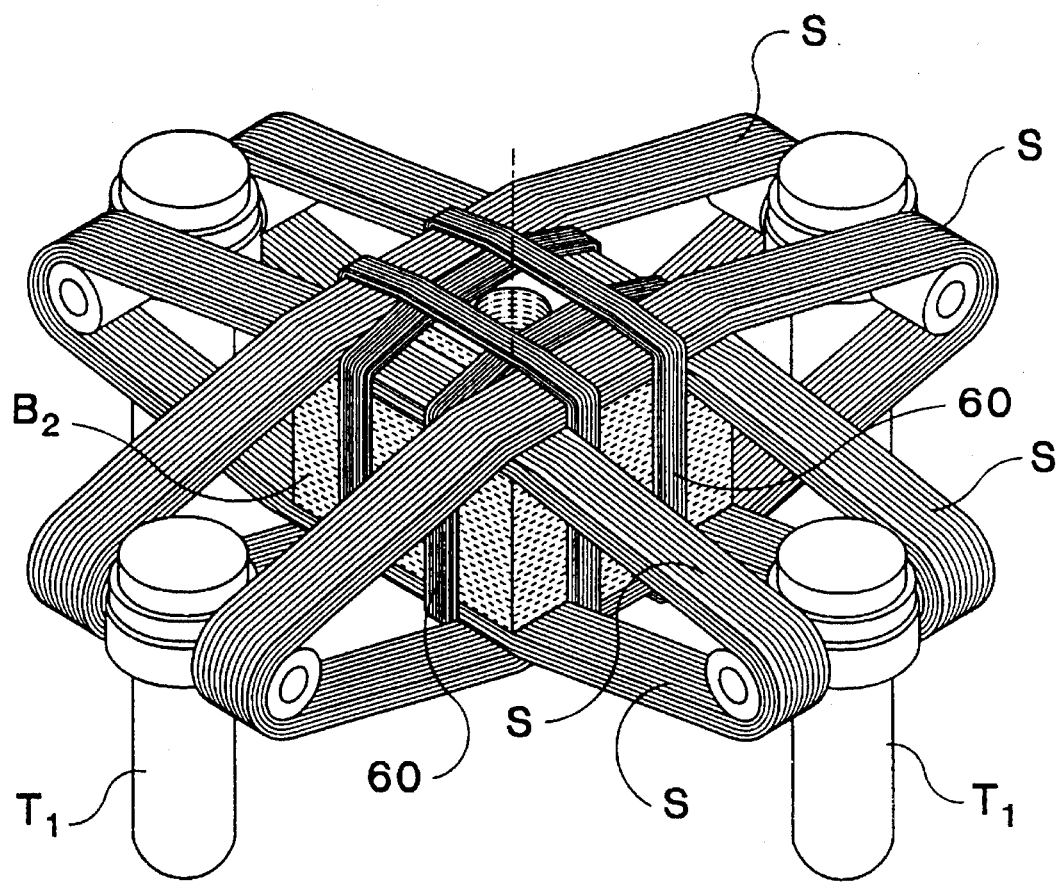
FIG. 7 illustrates the centrifuge construction of the rotor of this invention with reinforcing straps about the central rotor body.

It will be understood that with increasing speed, discrete straps S may have to be firmly held to central rotor body $B_1$. This being the case, and referring to FIG. 7, auxiliary bracing straps 60 can wrap both central rotor body $B_1$ and discrete straps S to effect firm and secure attachment of the straps to the central rotor body.

Figure 10:
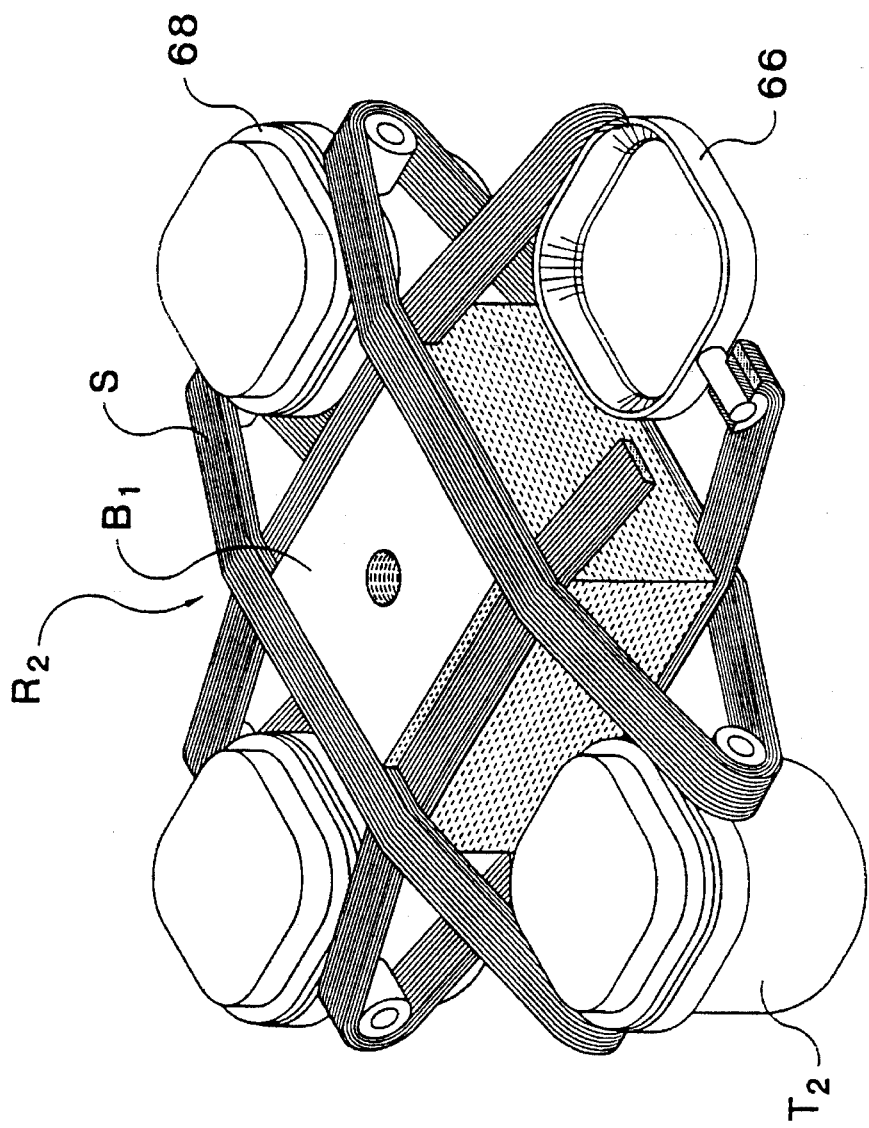
FIG. 10 is a perspective view of a high volume rotor including multiple-tube holder buckets for each holding multiple samples.

Referring to FIG. 10, it will further be understood, that multi-compartment sample tubes $T_2$ can be utilized with multiple tube swinging bucket rotor $R_2$. In this case, multiple compartment sample tube retaining ring 66 complimentary to multiple compartment sample tube annulus 68 can be utilized. Construction of such multi-compartment sample tubes $T_2$ is illustrated in FIGS. 11 and 12.

Figure 11:
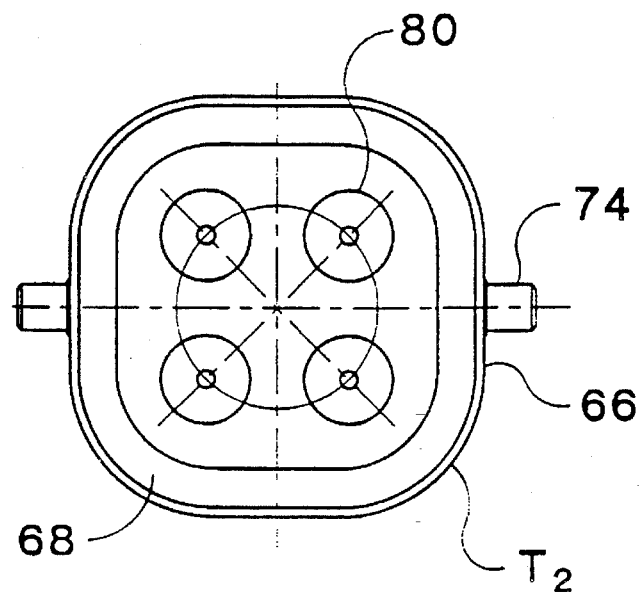
FIGS. 11 and 12 are respective plan schematic and side elevation section of a multiple tube bucket utilized in the rotor of FIG. 10.
Figure 12:
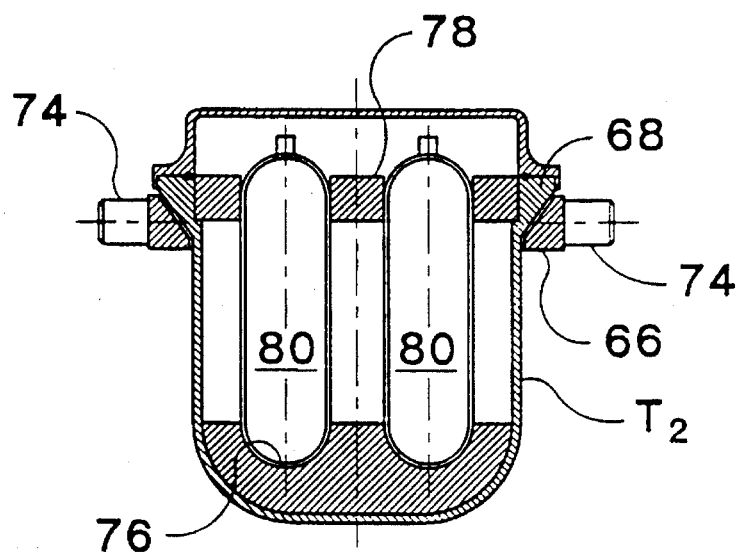

Referring to FIGS. 11 and 12, trunions 74 attached to multiple compartment sample tube retaining ring 66 support multi-compartment sample tubes $T_2$. These in turn include tube receiving indentations 76 and upper sample tube spacer 78 which hold discrete sample tubes 80 in counter balanced relation during centrifugation.

Figure 13:
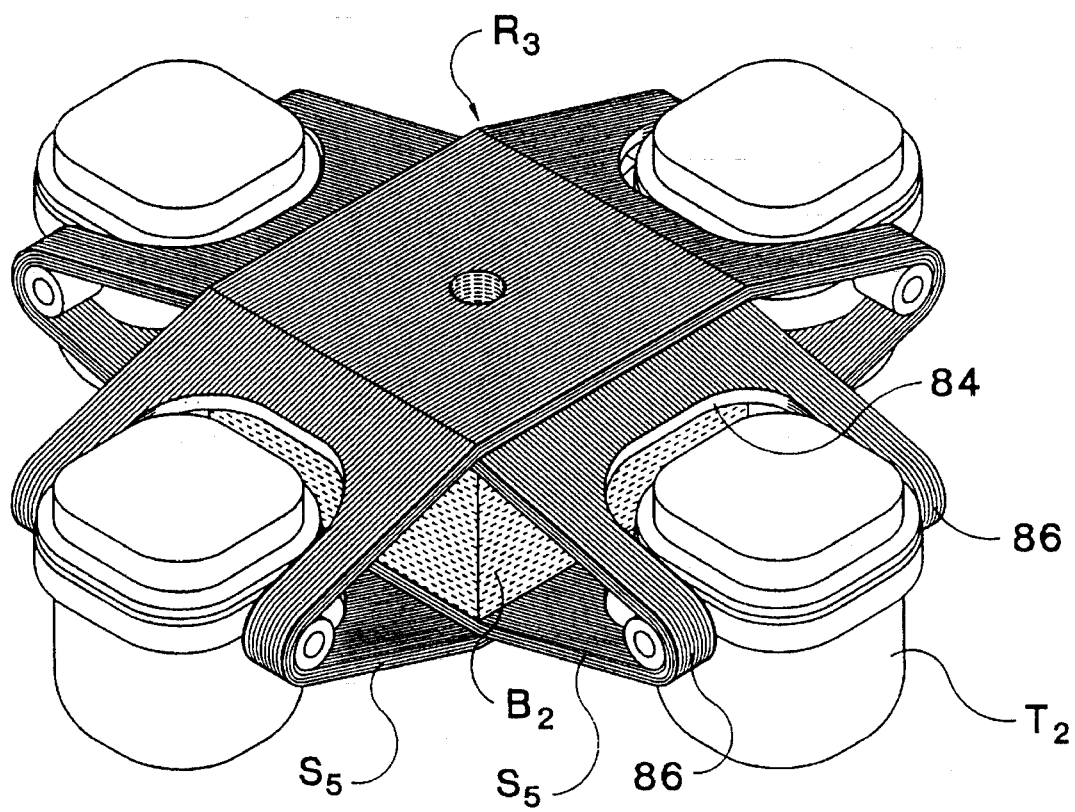
FIG. 13 is an alternate embodiment of the rotor of FIG. 10 illustrating the strap for holding the multi-sample buckets constructed with a single strap configuration having the bucket retaining loop of the strap cut away to receive the multi-sample retaining buckets; and, FIG. 14 is an adaptation of the swinging bucket rotor of this invention to an embodiment of centrifuge which includes a central drive stator within and driving the peripheral rotor of this invention.
Figure 14:
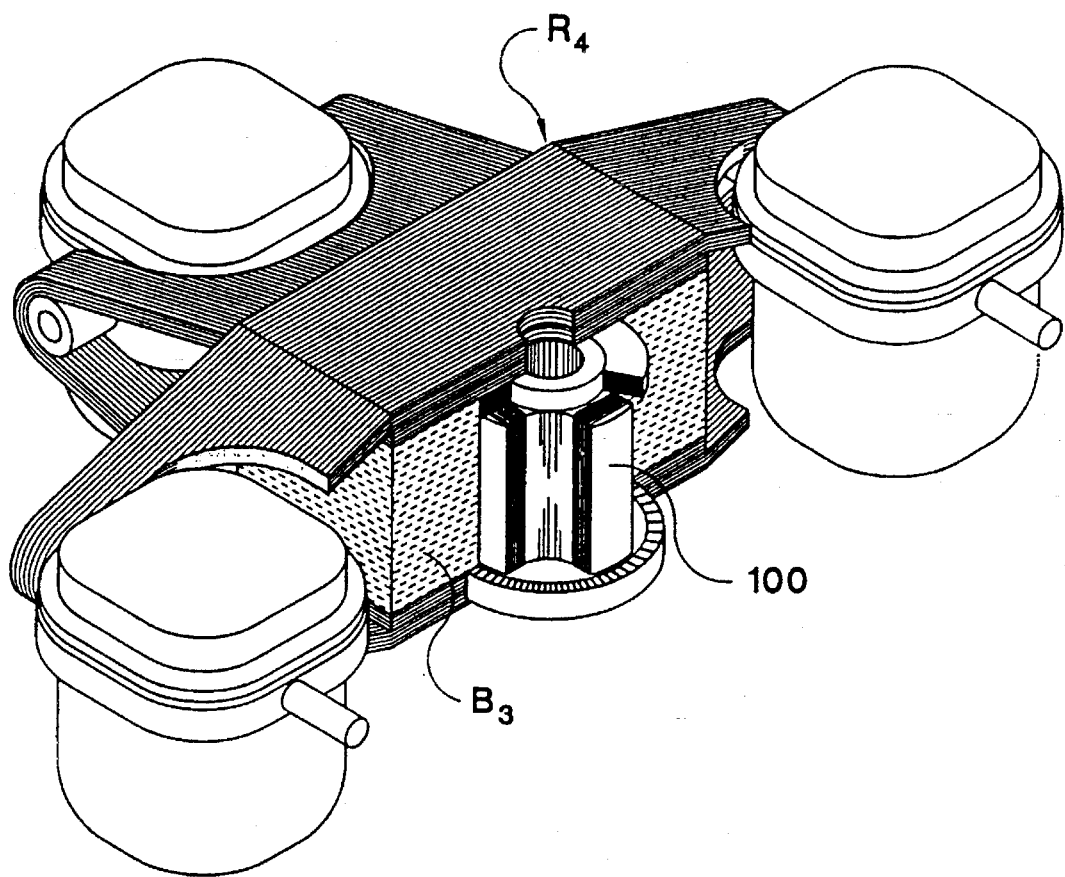

Referring to FIG. 13, multiple tube swinging bucket rotor $R_3$ is illustrated having cut away discrete straps $S_5$. In this case, cut away discrete straps $S_5$ are cut at central U-shaped cut 84 to define two distal and opposed strap loops 86 from single cut away discrete straps $S_5$.

In my co-pending patent application Ser. No. 08/288,387 entitled Centrifuge Construction Having Central Stator, I disclosed central drive stator 100 for driving a peripheral rotor. By the expedient of providing magnetic field entraining central rotor body $B_3$, coupling of multiple tube swinging bucket rotor $R_4$ to a rotating magnetic field generated by central drive stator 100.

It will be appreciated that in what has been disclosed, a departure from swinging bucket rotors of the prior art has been achieved.

What is claimed is:

1. A centrifuge rotor for rotation about a spin axis comprising in combination:

a central rotor body constructed about the spin axis;

at least one endless strap having a non-circular configuration with first and second opposite distal loops and first and second opposite medial portions, said at least one endless strap attached to said central rotor body at said first and second opposite medial portions with said first and second opposite distal loops remote from said central rotor body; and, means for retaining a sample tube for pendulous motion with respect to gravity of said sample tube mounted to each of said first and second opposite distal loops.

2. A centrifuge rotor for rotation about a spin axis according to claim 1 comprising in further combination:

said at least one non-circular strap is made from composite fiber.

3. A centrifuge rotor for rotation about a spin axis according to claim 1 comprising in further combination:

said central rotor body includes upper and lower flat surfaces with a first opposite medial portion of said at least one non-circular strap mounted to said upper flat surface and a second opposite medial portion of said at least one non-circular strap mounted to said lower flat surface.

4. A centrifuge rotor for rotation about a spin axis according to claim 1 comprising in further combination:

said central rotor body is made of composite material.

5. A centrifuge rotor for rotation about a spin axis according to claim 1 comprising in further combination:

said rotor includes first and second non-circular straps in side-by-side relation attached to said central rotor body; and, said means for retaining a sample tube for pendulous motion with respect to gravity includes trunions mounted between said first and second non-circular straps.

6. A centrifuge rotor for rotation about a spin axis according to claim 5 comprising in further combination:

said means for retaining a sample tube for pendulous motion with respect to gravity of said sample tube further includes;

means for removable attachment of said sample tube; and, at least one of said trunions attached to said means for removable attachment of said sample tube.

7. A centrifuge rotor for rotation about a spin axis according to claim 1 comprising in further combination:

said means for retaining a sample tube for pendulous motion with respect to gravity of said sample tube mounted to each of said first and second opposite distal loops includes means for mounting a plurality of sample tubes at each of said first and second opposite distal loops.

8. A centrifuge rotor for rotation about a spin axis according to claim 1 comprising in further combination:

said central rotor body includes strap retainers for maintaining said at least one non-circular strap to said central rotor body.

9. A process for constructing a centrifuge rotor for rotation about a spin axis comprising the steps of:

constructing a central rotor body about said spin axis;

winding at least one endless wound and cured fiber tow having a non-circular configuration with first and second opposite distal loops and first and second opposite medial portions;

cutting at least one endless strap from said at least one endless wound and cured fiber tow having a non-circular configuration with first and second opposite distal loops and first and second opposite medial portions, attaching said at least one endless strap to said central rotor body at said first and second opposite medial portions with said first and second opposite distal loops remote from said central rotor body;

providing a sample tube; and, mounting said sample tube for pendulous motion with respect to gravity of said sample tube at each of said first and second opposite distal loops.

10. A process for constructing a centrifuge rotor for rotation about a spin axis according to claim 9 and comprising the further steps of:

winding said at least one non-circular wound and cured fiber tow from composite fiber.

11. A process for constructing a centrifuge rotor for rotation about a spin axis according to claim 9 and comprising the further steps of:

providing said central rotor body with upper and lower flat surfaces;

mounting said first medial portion of said at least one endless strap to said upper flat surface; and, mounting said second medial portion of said at least one endless strap to said lower flat surface.

12. A process for constructing a centrifuge rotor for rotation about a spin axis according to claim 9 and comprising the further steps of:

constructing said central rotor body of composite material.

13. A process for constructing a centrifuge rotor for rotation about a spin axis according to claim 9 and comprising the further steps of:

cutting at least two endless straps from said at least one endless wound and cured fiber tow;

mounting said at least two endless straps in side-by-side relation to said central rotor body; and, retaining said sample tube for pendulous motion with respect to gravity of said sample tube between said at least two endless straps.

14. A process for constructing a centrifuge rotor for rotation about a spin axis according to claim 13 and comprising the further steps of:

mounting said sample tube for removable attachment; and, providing at least one trunion attached to said sample tube and said first and second opposite distal loops.

15. A process for constructing a centrifuge rotor for rotation about a spin axis according to claim 9 and comprising the further steps of:

wrapping said central rotor body with strap retainers for maintaining said at least one endless strap to said central rotor body.

* * * * *